Patented Jan. 1, 1929.

1,697,312

UNITED STATES PATENT OFFICE.

SIMON GELFAND, OF BALTIMORE, MARYLAND.

FOOD PRODUCT AND METHOD OF MAKING SAME.

No Drawing.   Application filed December 19, 1927. Serial No. 241,264.

My invention relates to a new food product and method of making the same and has to do more particularly with the production of an emulsion including vegetable oils, yolk material and the aromatic substances resulting from lactic acid fermentation of milk constituents and a process for preserving same.

If a milk product such as milk or cream is inoculated with a culture of lactic acid producing organisms, the product will become thickened by virtue of the enzymes secreted by the organisms, which have an effect upon the water imbibing capacity of the protein material in the milk; also, the lactic acid organisms will produce lactic acid and a number of other constituents, which have a distinctive flavor and taste, depending upon the type of organism used. However, if the organisms are allowed to propagate, they will die and the milk product will become putrid as a result of the multiplication of other putrifying organisms present.

One of the features of my process consists in treating the emulsion in such a manner as to retain the aromatic substances produced by the bacterial of the milk product and at the same time, preventing the product from putrifying at ordinary room temperature, although including also yolk and vegetable oils.

Another feature of my process which includes the introduction into the vegetable oil of the aromatic substances produced from milk constituents, is the introduction of valuable biological potent substances such as vitamines, which are in abundance in milk products and which are usually not present in vegetable oils.

Another advantage of this process consists in the introduction with the milk constituents of colloidally sub-divided protein material, which aids in the emulsification of the vegetable oils. There are other advantages, which will be discussed later.

In the production of my food product, I pasteurize a suitable milk material and inoculate it with a suitable quantity of a good viable culture and allow it to set at 70° F.; when the proper amount of acid has been developed and the organisms have produced a sufficient quantity of flavoring constituents, it is ready to be used with the other ingredients of the emulsion.

There are various ways in which this first step of the process may be carried out. I will illustrate a few of them.

Fresh, whole milk is pasteurized at 140° F. in a suitable vat for 30 minutes. It is then cooled down to a temperature of 70° F. and about 1% of a good, strong culture properly prepared is introduced and mixed and allowed to set overnight until the product develops acidity and thickness.

Another way of carrying out this step of the process is to take the milk or cream and put it through the homogenizer by means of which the fat globules and the casein material becomes sub-divided in smaller units and the resultant product thickens. It is then set with a culture and allowed to ripen in the usual manner.

Still another way in which this step of the process may be used is to take the ripened cream and churn it into butter. In this manner, the aromatic substances produced by the organisms will be absorbed by the butter fat and also the vitamines present in the milk material will be concentrated in the butter. This butter, which is in the form of an emulsion, may be used in our product.

Still another method in which this step of the process may be carried out is to take this butter and melt it and mix it with warm milk material and put it through a homogenizer, in which manner the fat material of the butter becomes sub-divided and finally disperses into the water constituents of the milk.

I now take one of these products, that is the milk material containing the vitamines as well as the flavoring constituents, and properly emulsify and combine it with vegetable oil and yolk material. The following illustrates a preferred method of carrying out this step of the process.

Yolk material is placed in a bowl and to it is added the oil by means of agitation, stirring or whipping by any convenient whipping device. The oil is added at such a rate as to allow the oil to become sub-divided and incorporated in the yolk material. Sufficient oil is added to make a stiff and heavy emulsion of a butter-like consistency. Then, the cultured milk product is added and emulsified into the mixture. At this stage of the process, a sufficient amount of edible organic acid is added in water solution in a quantity sufficient to stabilize it by increasing the continuous phase emulsion and prevent its separation on shaking, and also of sufficient hydrogen ion concentration to suppress further growth of the organisms and their biological activities which have been introduced with the cultured milk material, so that no further undesirable bacteriological changes will take place in the product after it is placed on the market.

If desired, other constituents may be incorporated such as spices, condiments and salt. However, they may be omitted. In making a batch of the product, the following formula may be used:

Forty per cent (40%) cream is pasteurized and homogenized and inoculated with a lactic acid organism and allowed to ripen until the product becomes thick and attains a desirable aroma. I now place in a bowl, 9 pounds of yolk material, 1 pound of salt, and add 70 pounds of oil by means of agitation and stirring at a rate of speed so that the oil will become sub-divided into the yolk material and a plastic mass of a very heavy consistency is formed. Eight (8) pounds of the homogenized cream is then added while stirring the mixture, and 3½ pints of 10% vinegar is also introduced to thin out the emulsion.

I do not limit my invention to the materials stated above. Other substances may be added such as mustard and other spices; for example, in the above batch, ¾ pound of mustard may be added. In the latter case, the mustard is added to the yolk material and beaten for a short interval of time to incorporate the same.

The product when thoroughly mixed will be of a creamy consistency, smooth in its nature, with a velvety like texture with a pleasant and desirable flavor and is ready to be placed in bottles or jars of suitable size for use.

This product also will stand handling and will not separate in transportation, as the emulsion has been stabilized by the aqueous liquid containing the acid and also by the additional amount of colloidal casein material.

The hydrogen ion concentration in the product is sufficient to substantially, if not entirely, arrest the further growth and biological activity of the organisms introduced in the culture and also will prevent putrefaction, due to the presence of proteolitic organisms, which have been introduced with the milk material.

I do not limit myself to the use of vinegar, but I may use any suitable edible organic acid such as lactic acid, tartaric acid, citric acid or acetic acid dissolved in an aqueous medium added in sufficient concentration to overcome the buffer effect of the protein material present and capable of suppressing the growth of the organisms introduced with the cultured milk material. If desired lemon juice may be used. Neither do I limit myself to a specific milk material. Milk, in its various modifications such as cream and butter, which has been previously cultured with a lactic acid and aromatic producing organisms may be employed if desired.

What I claim as new and desire to secure by United States Letters Patent is:

1. An emulsion including edible vegetable oil, yolk material and fermentation products of lactic acid organisms on a medium containing milk constituents with sufficient edible organic acid to prevent the further proliferation of the organisms introduced with the milk constituents.

2. An emulsion including edible oil, yolk material and a cultured milk product, together with a stabilizing substance for preventing propagation of putrifiable organisms introduced by the milk product.

3. The method of producing a food product consisting of making an emulsion including oil and yolk material and incorporating therein by emulsification a cultured milk product, and adding a sufficient amount of edible organic acid in water solution suitable to stabilize the product.

4. The method of producing a food product consisting of making an emulsion including oil and yolk material and incorporating therein by emulsification a cultured milk product, and adding a sufficient amount of edible organic acid in water solution suitable to stabilize the product, said last element being of a character tending to suppress further growth of organisms and their biological activities introduced with the cultured milk product.

5. An emulsion including edible oil, yoke material, butter and a stabilizing substance for preventing propagation of putrifiable organisms introduced by the butter.

6. The method of producing a food product consisting of making an emulsion including oil and yoke material, incorporating butter therewith by emulsification, and adding a sufficient amount of edible organic acid in water solution suitable to stabilize the product.

In witness whereof, I hereunto subscribe my name this 18th day of November, 1927.

SIMON GELFAND.